3,199,105
DISTANCE MEASURING SYSTEMS
Emory Lakatos, Santa Monica, Calif., assignor to Thompson Ramo Wooldridge Inc., Canoga Park, Calif., a corporation of Ohio
Filed Feb. 26, 1960, Ser. No. 11,378
12 Claims. (Cl. 343—13)

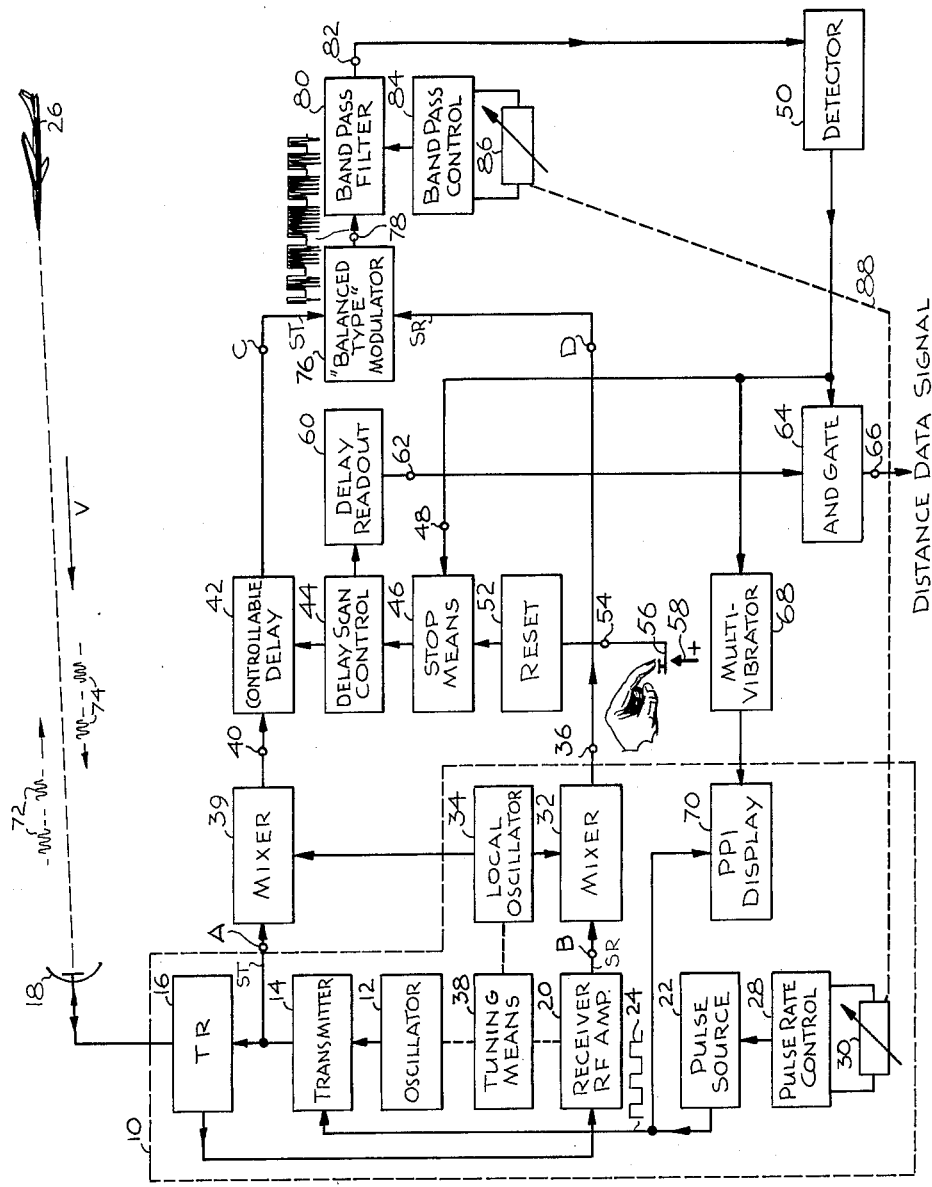

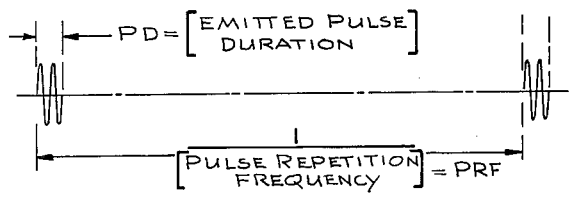
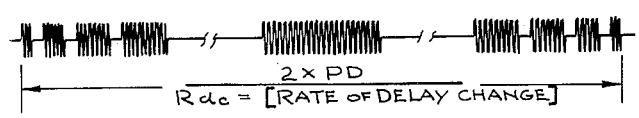
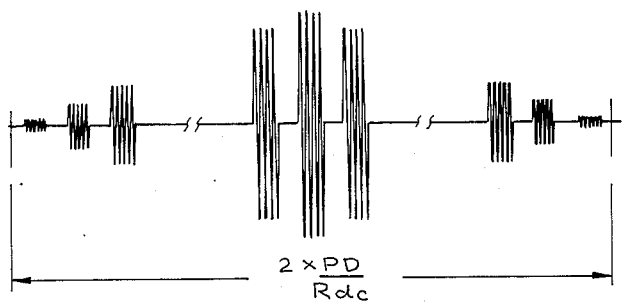
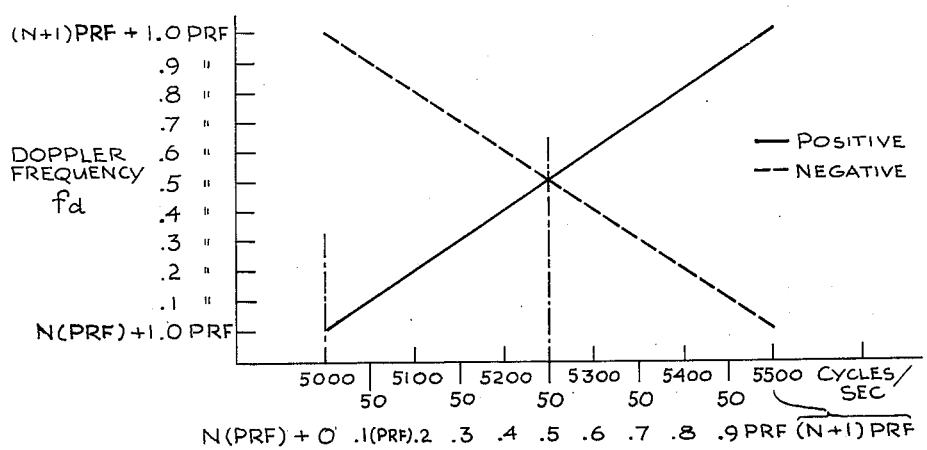

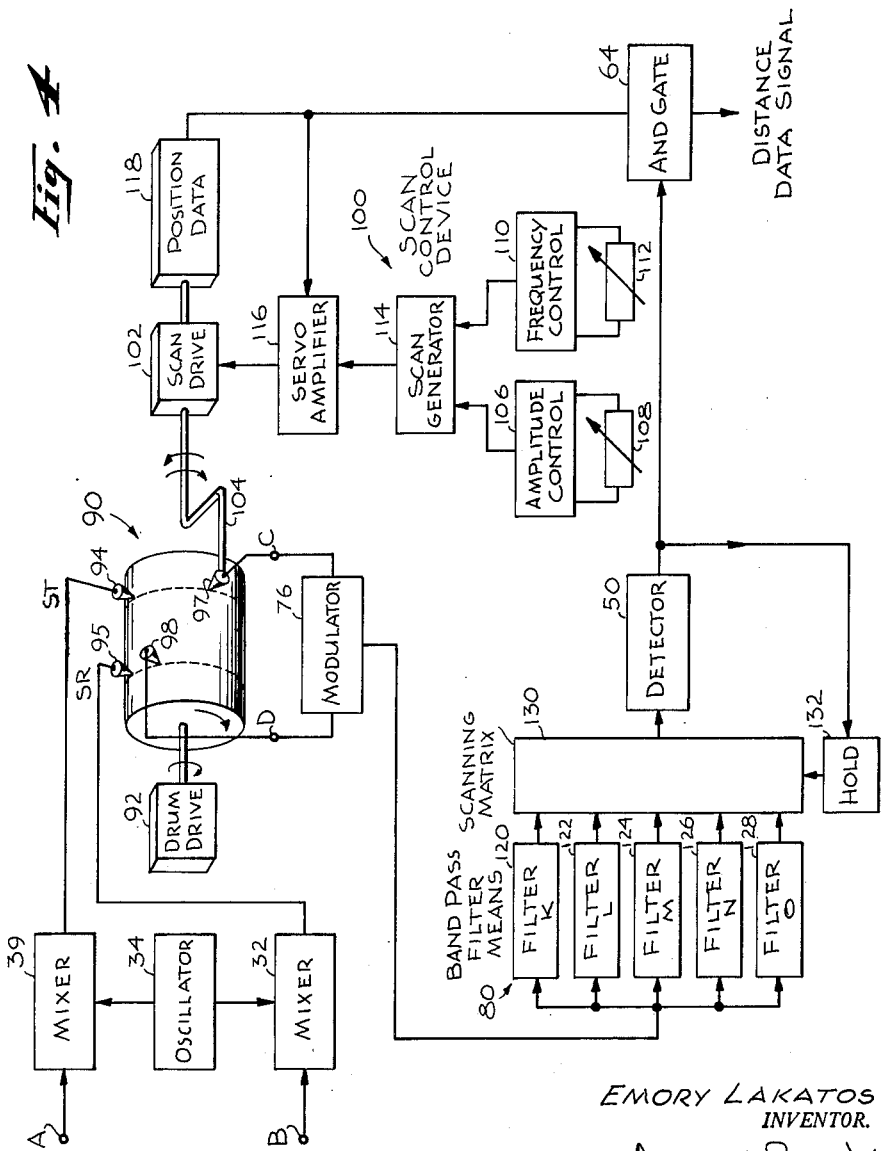

This invention relates to improvements in the art of measuring distance through the agency of emitted and reflected wave energy.

More particularly the present invention is directed to improved methods and apparatus capable of increasing the accuracy and range of conventional apparatus employed in certain known forms of distance measuring systems based upon emitted and reflected wave energy.

In the prior art, there have been proposed a variety of arrangements classified as "distance measuring" or, alternatively, "range determining" systems. One of the more common classes of such systems depends upon the direct emission of electromagnetic waves and the subsequent detection of the waves after their reflection from some body, surface or other discontinuity in the attending was propagating medium. Knowing the propogation velocity of the emitted waves in the propagating medium and having foreknowledge of certain general geometrical relationships which exist between the locations at which the wave energy is emitted, reflected and detected, distance measurements can be made by measuring the time differences which are ultimately produced between the directly emitted waves and their detected reflections. These reflections are sometimes called "echoes."

Two main categories in this class of position determining systems are commonly recognized. In the first category, often referred to as "continuous-wave" systems, substantially constant amplitude electromagnetic waves are continuously emitted and their reflections, or echoes, are continuously detected (the systems of U.S. patent to Espenschied 2,045,071, and U.S. patent to Guanella 2,253,975 are examples). In the second category, sometimes termed "pulsed-wave" systems, periodically recurrent pulses of wave energy are emitted and their reflections are continuously detected (see U.S. patent to Wolf 1,924,174).

Regardless, however, of the particular category of distance measuring system employed, it is seen that the prevision with which distance may be measured is directly related to the accuracy with which the elements of the system are capable of measuring the value of time difference between a signal representing a directly emitted wave and a signal representing a reflection or "echo" of that wave.

In both of the above categories, it has been the practice to measure time difference between directly emitted waves and their reflections by means of controllable signal retardation devices acting in combination with some form of coincidence detecting device or phase measuring device. Typically, either signal representations of the directly emitted waves or their reflections are time delayed (or retarded), in varying amounts, until coincidence or phase coincidence agreement is caused to exist between a signal representing a received reflected wave and a signal representing the directly emitted wave producing this reflected wave. The magnitude of delay necessary to produce this coincidence is then taken as a main determinant of the value of time difference between the direct and reflected waves, and hence the magnitude of the particular distance of interest. Time difference measurement may also be realized in pulsed-wave systems of the second category, by means of known time-demodulation circuits, as shown, for example, in the book entitled, "Waveforms," Radiation Laboratories Series, volume 19, page 535.

Experience has shown, however, that while such prior art systems operate successfully under relatively high signal-to-noise conditions, difficulty is encountered in their operation under low signal-to-noise conditions. This is found to be especially true when the distance being measured is subject to continuous change as in the case where there exists relative motion between the transmitter and the receiver or between either the transmitter or receiver and the reflective body. Distance measurement and tracking of high-speed aircraft ranges, under high ambient noise conditions, is an example of this type of operational environment.

There are two main reasons for these operational difficulties. First, under low signal-to-noise conditions, it becomes difficult to distinguish between signals representing the reflections which are received and signals originating as ambient noise. Thus, the above time measurement schemes, which depend upon controlled retardation of a version of a directly emitted wave to enforce its coincidence with a received reflection, become impracticable under very low signal-to-noise conditions because it becomes virtually impossible to distinguish the reflection from the received noise. Second, where the distance between the transmitter and the receiver and the reflective body is changing during distance measurement, substantial and sometimes different degrees of time distortion, generally called "Doppler-shift," are imposed upon the directly emitted wave and the reflection. This militates against the use of time difference measurement techniques based upon the phase comparison between a directly emitted oscillatory wave and its reflection mainly because of the effects of time distortion, or Doppler-shift, produce a substantial difference between the effective frequencies of the wave and reflection. Two signals of different frequency, of course, bear no fixed phase relationship to one another.

In an effort to combat the deleterious effects of high-intensity noise in distance measuring systems employing emitted and reflected wave energy, some workers in the art have attempted to employ signal correlation techniques in measuring the time difference between directly emitted waves and their reflections. This has been disclosed, for example, as shown in the above-referenced U.S. Patent 2,253,975 to Guanella, by amplitude modulating a continuous oscillatory radio frequency carrier wave with a nonperiodic complex multifrequency signal. This modulated carrier wave is then emitted on a continuous basis and the reflections which are received are demodulated in a conventional manner to produce an envelope signal. This signal, representing modulation extracted from the reflections, is multiplied with a controllably delayed signal version of the multifrequency signal employed, in the first instance, to modulate the carrier wave.

However, it is recognized in the practice of the above-described modulated continuous wave system, that unless very critical and complex signal processing techniques are employed, extreme care must be exercised to ensure that the envelope signal be processed within the system in such a fashion that the phase and amplitude relationships of its components do not substantially differ from the phase and amplitude relationships existing between like components of the complex multifrequency signal used to modulate the carrier. Furthermore, to avoid ambiguities in distance measurements, the complex signal used to modulate the carrier must be of a character such that it cannot be completely decomposed into fundamental and harmonic frequencies. It is further necessary in this arrangement that extreme care be exercised to ensure that no substantial amount of the continuously emitted wave energy be directly received by the echo receiving antenna. Further, since time measurement is based upon the demodulation of received reflections, it develops that substantial errors in time measurement are produced as a result of cross-modulation products formed between received noise and the complex signal envelope borne by the reflections.

The present invention is, therefore, directed to an improved distance measuring system employing emitted and reflected wave energy which permits accurate distance measurements to be made under signal-to-noise conditions so low as to be considered prohibitive in prior art systems of this type. The present invention further provides a distance measuring system which is substantially immune to time distortion or Doppler-shift influences caused by relative motion between the transmitter, receiver and the surface from which the reflections are derived. Additionally the present invention overcomes the need for critical processing of received information, as to phase and frequency distortion of its components, and obviates the need for transmitting a continuous wave signal bearing complex modulation in order to realize high noise immunity and permit accurate distance measurements.

As will be seen, a particularly useful feature of the present invention resides in the fact that it may be easily embodied, at relatively low cost, in existing types of pulsed-wave, distance-measuring equipments so as to increase the effectiveness of these equipments by permitting advantages of the present invention to be realized.

In achieving its purposes, the present invention embraces novel distance measuring systems based upon emitted and reflected waves in the form of periodically recurrent bursts or pulses of an oscillatory wave. According to a preferred form of the invention, high detail signal representations of each directly emitted pulse and its received reflections, which may include a frequency change due to the Doppler-shift effect, are developed and multiplied together on a "balanced" basis to produce a "balanced-type" product signal which is virtually of zero amplitude at all times except during the representation of an emitted pulse. During the multiplication, the relative timing between these emitted and reflected signal representations is controllably varied over a predetermined range of time delay values, and at a predetermined rate of change of time delay. The resulting product signal contains frequency components distributed about the Doppler frequency as a fundamental, and is then subjected to rather noncritical band pass filtering which detects the presence of the Doppler frequency. In accordance with the present invention, however, the filtering preferably embraces a band of frequencies, the width of which band is at least equal to one-half the pulse repetition frequency of the emitted waves. Under certain operational environments it is further anticipated by the present invention that the band of frequencies embraced by the filtering include some harmonic of the emitted pulse repetition rate.

Also, in accordance with the invention, it is preferred that the effective "build-up-time" or time-constant of the band pass filtering to which the product signal is subjected be made substantially no greater than the quotient of the pulse duration divided by the rate at which the relative delay between the directly emitted and received echo changes.

In further accordance with a preferred form of the present invention, the maximum rate at which the relative timing between the signal representations of the directly emitted and reflected waves is permitted to change is made less than twice the product of the emitted pulse duration and the rate at which the emitted pulses recur.

Amplitude variations in the above-processed balanced-type product signal, of the present invention, taken in combination with those specific values of controlled relative time delay imposed between the emitted and echo signal representations which produce these amplitude variations, then become highly accurate, unambiguous determinants of the distances being measured, and these determinants maintain their useful accuracy even under severely low signal-to-noise conditions and in the face of substantial time distortion influences such as those produced by Doppler shift effects.

As will be seen more fully hereinafter, the novel timing difference measurement techniques of the present invention may be embodied in a novel manner to provide effective distance measurements under both "search" and "track" modes of operation. Also the present invention permits the frequency of both the directly emitted oscillatory waves, as well as the recurrence frequency at which these waves are pulsed, to be controllably varied during both "search" and "track."

The operation of the present invention, as well as the above and other features of advantage afforded thereby will be more fully understood by reference to the following description, especially when read in connection with the accompanying drawings, in which:

FIGURE 1 is a block diagram representation of one form of the present invention;

FIGURES 2a, 2b and 2c are graphical representations of certain waveforms, the characteristics of which are useful in understanding the operation of that form of the invention illustrated in FIGURE 1;

FIGURE 3 is a graphical representation of the relationship between certain electrical signal frequency components developed in the operation of the present invention;

FIGURE 4 is a block diagram representation of another form of the present invention.

Figure 5:
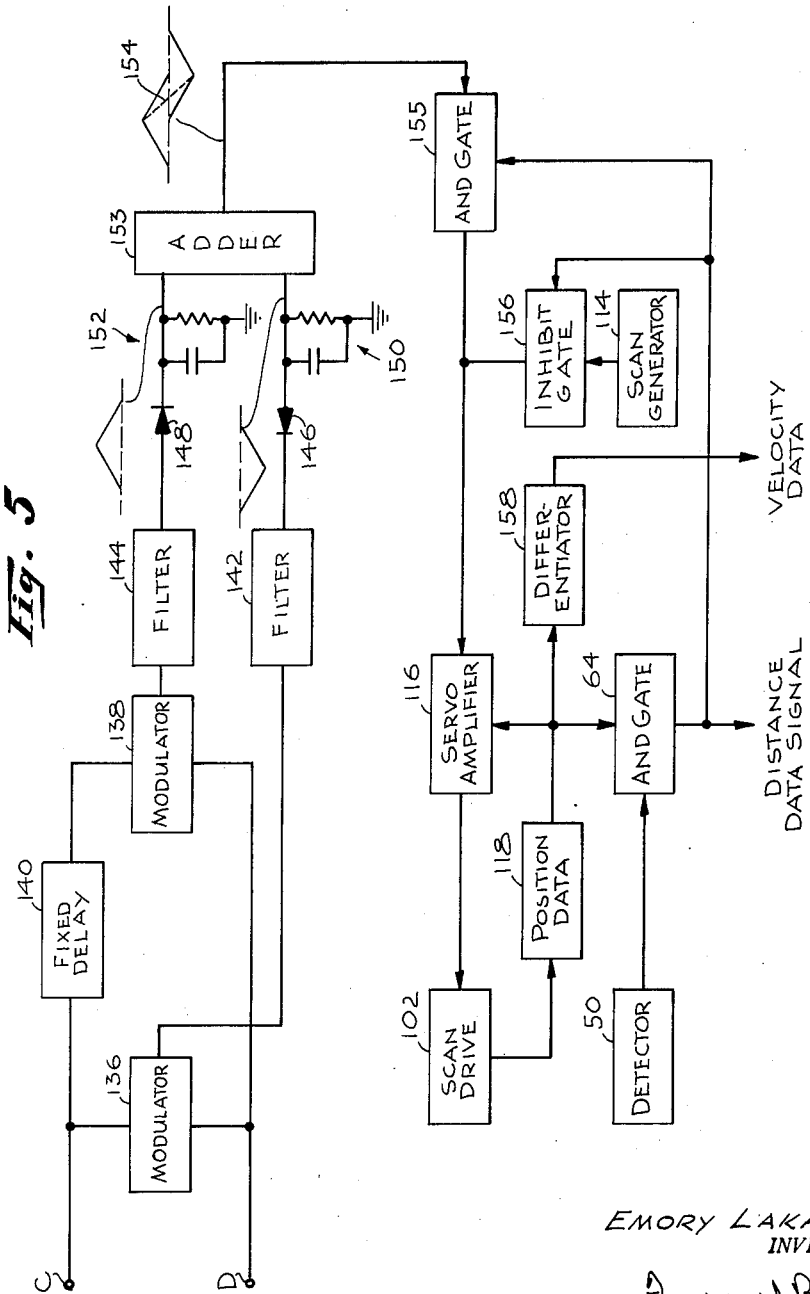
FIGURE 5 is a block diagram representation of still another form of the present invention.

Turning now to FIGURE 1, the present invention is illustrated in a form adapted to a conventional distance determining system of the pulsed wave radar variety. Those elements embraced within the dotted line area 10 will be recognized as being commonplace in present-day pulsed wave radar equipments.

More specifically, a source of oscillatory wave energy is provided as indicated by block 12. The oscillatory wave energy developed by the oscillator 12 is applied to a transmitter 14. Output signals from the transmitter 14 are, in turn, applied to a transmit-receive switching circuit 16 which is coupled to a transmit-receive antenna 18. The transmit-receive circuit 16 is also coupled to the input circuit of the radio frequency amplifying section of a radio receiver 20. The transmitter 14 is controlled by a train of periodically recurrent pulses produced by a pulse source 22. These recurrent pulses are generally indicated by the waveform 24. During the occurrence of each of the pulses, the transmitter 14 is effectively turned on and the oscillatory waves appearing at the output of the transmitter 14 are applied, for the duration of each pulse, to the transmit-receive circuit 16. In accordance with common practice, the transmit-receive circuit 16, upon excitation by the transmitter 14, acts to couple the transmitter 14 to the antenna 18 but protects the receiver 20 from the high transmitted power pulses. Periodically recurrent pulses of oscillatory waves are thereby directly emitted by the antenna 18. By positioning the antenna 18, these pulses of oscillatory waves may be directed to a target, such as an aircraft 26, from which they are, in turn, reflected and subsequently detected as echoes by the antenna 18. Between successive emitted pulses, the transmit-receive circuit 16 directly couples the antenna 18 to the receiver 20. Thus, reflections of the directly emitted pulses of oscillatory wave energy, as may be produced by reflection thereof from any number of surfaces, are communicated to the receiver during the inactive time of the transmitter 14.

As shown in FIGURE 1, the rate at which the pulses of oscillatory waves are emitted, which may be termed the "pulse repetition rate" (PRF), may be controlled by a pulse-rate control means 28, having a rate control adjustment 30. In accordance with prior art practice, echoes received by the receiver 20 are applied to a mixer circuit 32 in which the oscillatory echoes are heterodyned or beat with the signal developed by a local oscillator 34. The resulting signal appearing at the output terminal 36 of the mixer circuit 32, therefore contains pulsed oscillatory signal components, the timing, duration and wave frequency of which represent the detected echoes of the directly emitted pulses of wave energy. Tuning means, indicated generally at 38, are provided for varying the frequency of the oscillatory waves emitted by the transmitter and, at the same time, controllably tune the receiver 20 and local oscillator 34, so that all detected echoes appear at the mixer output terminal 36 at some predetermined intermediate frequency.

By way of example, the frequency of the pulsed oscillatory waves directly emitted by the radar system 10 may be of the order of 5 to 10 kilomegacycles. The rate at which recurrent pulses are emitted may, in turn, be established between 50 and 1000 pulses per second. The tunable frequency range of the local oscillator 34 may be established so as to provide, at output terminal 36, an intermediate frequency. For purposes of later description, a pulse repetition rate of 500 pulses per second and an intermediate frequency of 30 megacycles may be assumed.

In accordance with distance determining systems of this type, an arrangement is provided for measuring the time differences between members of the train of periodically and directly emitted pulses of oscillatory waves and their respective detected reflections or echoes. As discussed herein, this has previously been done in a variety of ways, such as through the use of range gates and coincidence detection circuits of various types. However, in accordance with the present invention, the directly emitted pulses of oscillatory wave energy, in addition to being applied to the antenna 18, are communicated as by a coaxial probe (not shown) to another mixer circuit 39, to which is also applied wave energy developed by the local oscillator 34. Thus, there will appear at the output terminal 40 an electrical signal having pulsed oscillatory signal components representing the timing, duration and wave frequency of the emitted pulses. The actual frequency of the oscillatory components in the signals delayed at output terminal 40 will, of course, be reduced to a value substantially corresponding to the oscillatory signal components appearing at the output of mixer 32, the latter representing reflections of the directly emitted pulses.

In accordance with the present invention, means are provided for operating upon the respective signals appearing at output terminals 36 and 40 for imposing controllable and known values of relative time delay between the components of these signals. The range of time delay values which are imposed between these two signals is made sufficiently large to bring into substantial time agreement those components of the signals appearing at output terminals 36 and 40 which represent a given emitted pulse and a respective echo of that pulse. This is conveniently done, in accordance with the present invention, by means of a controllable delay apparatus 42 connected to the output terminal 40 of the mixer 39. The magnitude of delay imposed by the controllable delay apparatus 42 is governed by the action of a delay scan control means 44 whose action may, in turn, be arrested by stop means 46. Stop means 46 is actuated by means of signals appearing at the input terminal 48 thereof, and is coupled to receive signals from the output terminal of a detector 50, the operation of which is described below. The stop means 46 is also controlled by means of a reset circuit 52 so that after being actuated by means of signals appearing at input terminal 48, it may be, in turn, inactivated by the application of a signal to the input terminal 54 thereof.

As shown in the arrangement of FIGURE 1, the reset circuit 52 may be actuated to deactivate the stop means 46 by means of a manually depressible switch key 56 which controllably applies potential from a voltage source having a terminal indicated at 58.

The magnitude of delay imposed between the signals appearing at output terminals 36 and 40 is in any given instant "read-out" by a suitable delay read-out means indicated at 60. Thus, the magnitude of the potential appearing at output terminal 62 of the delay read-out means 60 is at any given instant directly related to the value of a relative delay which the controllable delay means 42 imposes between components of the signals appearing at output terminals 36 and 40. This delay indicating potential is coupled to an "and" gate 64 which, upon the receipt of a signal from the detector 50, communicates the delay indicating potential to the distance data signal output terminal 66. A multivibrator 68 is also coupled to the output of the detector 50. Upon the development of an output signal by the detector 50, the multivibrator 68, in turn, cooperates with a conventional plan position display means 70 to which is also applied the periodically recurrent pulses 24.

In order to measure the timing differences between the members of the directly emitted pulse train, indicated at 72, and their respective echoes, indicated at 74, means are provided in accordance with the present invention for actively multiplying the signals appearing at the output terminals 36 and 40 after, however, the signals have been acted upon by the controllable delay means 42. To this end, a balanced-type modulator 76 is provided. The output of the controllable delay means 42 is applied to one input of the modulator, while the output of the mixer 32 is applied to the other input of the modulator. The modulator 76 is, therefore, responsive to the signals applied thereto to produce a product signal at output terminal 78 thereof. Since the modulator 76 is of the balanced type, this product signal represents substantially only those electrical signal components which result from the multiplication of the two signals appearing at output terminals 36 and 40, after, of course, the action of controllable delay means 42. The modulator 76 provides product signals having frequencies equal to the sums and differences of the frequencies of the signals appearing at output terminals 36 and 40, which signals do not themselves appear in the product signals. In accordance with the present invention, the product signal appearing at output terminal 78 is applied to a frequency selective filtering means such as a band pass filter 80. In a preferred form of the invention, the frequency selective characteristics of the filter 80 are established such to develop an output signal at a terminal 82 which represents substantially only those component frequencies of the product signal appearing at terminal 78 which fall below a frequency substantially equal to the reciprocal of the magnitude of time during which each emitted pulse endures. The characteristics of the band pass filter 80 are, in accordance with the present invention, made controllable by means of a band pass control means 84. The band pass adjustment element is indicated at 86 and is, in accordance with the particular form of the present invention shown in FIGURE 1, mechanically coupled to the rate control adjustment 30 of the pulse rate control means 28. This mechanical coupling is generally indicated by the dotted line 88. As will be more fully understood hereinafter, it is not necessary that the coupling 88 be of a mechanical nature, its purpose being merely to control the band pass characteristics of the filter 80, in accordance with the rate at which recurrent pulses of oscillatory wave energy are periodically emitted.

In the operation of the arrangement shown in FIGURE 1, the transmitter 14 of the radar system 10 generates, in conventional fashion, trains of pulsed waves for emission by the antenna 18 toward a distant object or reflecting surface. The individual pulsed wave segments of the train each are of a selected pulse duration (PD), as controlled by the pulse source 22. In the presently discussed example, the pulse repetition frequency (PRF), established by the pulse rate control 28, and the transmitter 14 frequency, established by the oscillator 12 under control of the tuning means 38, are selected to be substantially constant at some predetermined values.

The radar system 10, which may include separate synchronizing and indicating means (not shown) is capable of operating essentially independently in deriving range and direction information from reflected waves, such as echoes from a distant aircraft 26. When operating in this manner, the high power transmitter 14 signals are radiated from the antenna 18 toward the aircraft 26 and reflected back to excite the antenna 18 during the dwell time of the radar system 10. In accordance with prior art techniques, the pulse envelope of the received signals may be then detected by a receiver system and the time of transmission to and from the reflection object may be related to the antenna 18 attitude to give range and direction information. Such operation is not, however, feasible in known systems at extremely long ranges, or in the presence of high ambient noise levels or interfering signals which prevent the signal envelopes in the received waves from being clearly distinguished. As will be seen, as the specification proceeds, the system of the present invention may either be used to augment the capabilities of an independently functioning conventional pulsed wave radar system, or be used separately in conjunction with certain elements of conventional radar systems to materially improve the capability of apprehending the position of a reflecting object.

Initially, in what may be termed a start condition, the band pass filter 80 is set by the band pass control means 84 and band pass adjustment element 86 to be frequency selective to pass a predetermined range of frequencies. The delay scan control 44 continuously varies the value of delay provided by the controllable delay means 42, the delay scan control 44 being free to operate by virtue of the release or inactivation of the stop means 46. As the pulses of oscillatory waves are generated and directly emitted toward a reflecting surface, representations of both the directly emitted and the reflected signals are generated at the output terminals 36 and 40.

The signals applied to the controllable delay means 42 are representations, in pulse duration, frequency and time of occurrence, of directly emitted pulses. The signals appearing at terminal 36, however, are not only accompanied by noise but in addition may be subject to the Doppler-shift effect discussed above. Thus the signals appearing at terminal 36 may differ in frequency from the signals appearing at terminal 40 by a value determined by the Doppler shift, if one exists. Concurrently, however, a varying time relation between the two trains of pulses is imposed by the controllable delay 42 as governed by the delay scan control 44. The representations of the initial, directly emitted, train of oscillatory wave pulses may therefore be visualized as being presented in changing time relationship to, or scanning across, the signal representations of the train or reflected pulses. As agreement in timing relationship is approached between these two pulse trains, the individual pulses in the two signal trains commence to come into increasingly more perfect time agreement with one another, or what will be referred to as an overlapping relationship. As the delay scan control continues to change the value of delay in a given direction, the pulses will overlap in time more and more until full coincidence is obtained, after which the overlap continues in decreasing fashion until overlap ceases. When the full limit of delay is reached the direction of delay is reversed and the signal trains may again be caused to pass through full coincidence relationship, and this changing of relative delay between the established limits may be repeated as often as desired.

The signal appearing at output terminal 78 is substantially of zero amplitude except when the representation of a directly emitted pulse is applied to the modulator 76. When no overlap relationship exists, as described above, only the noise and interfering signals appear at output terminal 78. With the beginning of the overlap relationship, however, a controlled interval of time is defined, in which overlap interval pulses of oscillatory waves appear having the Doppler frequency as a carrier or fundamental frequency. The carrier is effectively pulse modulated in accordance with the successively changing amounts of time agreement during the overlap interval. Because the modulator 76 is of the balanced type, only the sum and difference components of the applied input frequencies appear at output terminal 78. With transmitted and reflected waves being represented at some I.F. frequency, such as 20 megacycles, the sum frequency components are clearly distinct from the difference frequency components arising from the Doppler effect. If it is assumed that the maximum expected rate of closure between the antenna 18 and the reflecting object corresponds to Mach 3, the maximum Doppler frequency shift will be approximately 60,000 c.p.s. Maximum rate of closure will seldom occur, however, and in the usual instance the value of the frequency shift introduced by the Doppler effect may be somewhere in the range of 20,000 to 30,000 c.p.s.

The overlap interval provides signals and relationships which are effectively utilized in the remainder of the system. It will be seen that the number of pulses which will overlap during the overlap interval is directly dependent upon the rate of delay change ($R_{dc}$). A very fast rate of change in the delay might result in only slight overlapping of single pulses, or none at all, while changing the delay at a very slow rate may result in the overlapping of many successive pulses of the two trains. It will be recognized further that the pulse duration also directly affects the duration of the overlap interval and the magnitude of the time interval over which at least some overlap ensues. These relationships are indicated in general fashion in the waveforms of FIGURE 2, in which FIGURE 2a provides a representation of two successive emitted pulses of oscillatory waves. The oscillatory waves, the duration of the pulses and the interval between pulses which are shown are not drawn in proportion, but have been greatly simplified for ease of representation. In the example here chosen, the emitted pulse duration (PD) may be regarded as 2 microseconds, the pulse repetition frequency (PRF) approximately 500 c.p.s., while the spacing between pulses approximately 2 milliseconds.

In FIGURE 2b, to which reference is now made, is shown pulse modulated oscillatory waves at the Doppler frequency which arise during the intervals of the overlap of the pulses in the two trains. Again, it will be recognized that the periodicity of the oscillatory waves, the duration of the pulses and the spacing between the pulses are not drawn to scale but are pictured so as to emphasize the factors involved.

The duration of the "overlap interval," that is the interval throughout which at least some overlap occurs, is given by the relation $$2\frac{PD}{R_{dc}}$$

The pulse duration is determined by factors relating to the radar employed, and the mode of operation which is to be used. The magnitude of delay change, however, is determined principally by the range which is to be searched by the radar, which directly controls the time delay values or limits between which the delay scan is to operate. Assume, in a practical example, that the minimum range is to be 60,000 feet (10 nautical miles), and the range to be searched therefrom extends another 140,000 feet, or approximately 23 nautical miles. The equivalent range of time delays which must be searched corresponds to approximately 280 microseconds. The time of search in a given direction could extend for several minutes, but the location of the distant object should be accomplished as rapidly as is feasible. Assuming, for example, that the rate of change of delay is approximately 0.2 microsecond for each 2 milliseconds, the maximum search time is approximately $$\frac{280}{\frac{0.2}{2\times 10^{-3}}}$$

or 2.8 seconds, which is a satisfactory searching speed. The duration of the overlap interval, $$\left(2\frac{PD}{R_{dc}}\right)$$

is 40 milliseconds for these assumed values.

Within the pulse overlap interval, the change in the delay at the rate of 0.2 microsecond per 2 milliseconds will produce successive increases in pulse overlaps in 0.2 microsecond steps, up to full coincidence of 2 microseconds, when there is time agreement between the representations of the directly emitted and reflected pulse trains, then a decrease in corresponding steps until there is again no overlap. This is illustrated in FIGURE 2b. However, it will be appreciated that the fundamental frequency at the value established by the Doppler shift and represented in a general way in FIGURE 2b actually consists of a spectral distribution of frequency components which are determined both by the Doppler frequency, which may be represented as $F_d$, and by the pulse repetition frequency (PRF).

The processing of the signals in the manner thus far described has important advantages. The train of pulse modulated waves which are provided during the overlap interval are not subject to nonlinear demodulation or detection so that cross modulation products involving signal and noise components are not produced. Moreover, the spectral distribution of the components of these waves is usefully spaced and located. That is, the spacing of the frequency components, or separate spectral lines, is dependent upon the various combinations of the harmonics of the pulse repetition frequency with the Doppler frequency. The energy distribution of the various frequency components corresponds to a $\sin/x$ pattern, centered about the fundamental which indicates that within wide limits adequate energy will be available from a given frequency component.

In accordance with the present invention, effective use is made of the spectral distribution of the generated Doppler pulses, so that the existence of time agreement due to the operation of the controllable delay 42 is detected by reliable but relatively simple means. The band pass filter 80 in the arrangement of FIGURE 1 operates to detect at least one of the frequency components within the spectral distribution of the Doppler pulses. Because the transient build up time required for a filter is inversely proportional to the bandwidth of the filter, however, the bandwidth of the filter must be maintained sufficiently large for the filter to be excited by the signals available during the overlap interval. In this connection, it is convenient to note that the pulses of substantially constant amplitude but varying duration in the waveform of FIGURE 2b may be recognized to be the equivalent of the pulses of constant duration but varying amplitudes shown in FIGURE 2c, such pulses extending over an interval corresponding to that of FIGURE 2b. The entire pulse trains of each FIGURES 2b and 2c include twenty pulses, in the selected example, although only a few of the pulses have been illustrated in detail and a broken line has been used to indicate that other pulses are present. The train illustrated in FIGURE 2c, moreover, may be shown to be substantially equivalent to a train of ten pulses which are of substantially constant amplitude and which extend over an interval of half the interval of FIGURES 2b and 2c, or twenty milliseconds. With this equivalence, it will then be recognized that the buildup time of the filter means employed may be related to the twenty millisecond interval. If the time constant of a filter is less than the twenty milliseconds, the signal at the filter output terminal will be fully built up and an accurate detection will have been provided. It will be appreciated by those skilled in the art that such relationships have certain advantages. Although the train of Doppler pulses is of a limited duration, the detection of a signal in the presence of noise may nonetheless be considered to be substantially as reliable as the use of an infinite set of pulses. Thus, the necessity for long coherent integration times encountered with pulse Dopplers, for example, is avoided.

With the system and operating values and relationships thus far described, a filter employed as the band pass filter 80 might conveniently have the band pass of fifty c.p.s. The band pass of such a filter is $1/50\pi$ c.p.s., or approximately six milliseconds, so that the twenty millisecond interval provided by the constant amplitude train of pulses equivalent to those of FIGURE 2b provides an interval which is 3.3 times the time constant interval, or considerably more than is needed for signal buildup.

The total range of frequencies to be encompassed by the band pass filter 80, and the location of this range of frequencies, are determined by certain other considerations. Basically, the band pass filter 80 must be at some practical region within the range of the Doppler frequencies likely to be encountered. For a maximum $F_d$ of 60,000, the $\sin x/x$ distribution of the frequency components permits the band pass to be located in the vicinity of 5,000 cycles per second, at which relatively small high efficiency coils are readily available. In accordance with the present invention, however, the relationships which are established permit a further reduction in criticality of and the requirements for filtering. The interaction of the pulse repetition frequency with the Doppler frequency provides a number of frequency components, each of which may be described by the relation $F_d \pm 500N$, where 500, is the pulse repetition frequency (PRF), and N is any integer. Thus, the spectral lines are separated by 500 c.p.s., and any filter which encompasses a 500 c.p.s. band intercepts and is responsive to the frequency components at one spectral line.

Further, where 500N exceeds $F_d$, the negative frequency line "folds" over to the positive side, to introduce frequency components which are interleaved with the other frequency components. The separation and the interleaving is determined by the value of $F_d$. In accordance with the present invention, this interleaving is used to advantage. Reference may be made to FIGURE 3, which shows the relationship between various values of the Doppler frequency and the harmonics which are generated for any given PRF with specific values shown for a PRF of 500 c.p.s. The solid line shown therein represents the distributions of the positive frequency components and the dotted line the distributions of the negative frequency components, folded over components occurring within the frequency band from 5000 to 5500 c.p.s. for a PRF of 500 c.p.s. Between limits which correspond to adjacent harmonics of the PRF, and for different values of $F_d$, the folded over negative line comprises a mirror image of the positive line. For any given Doppler frequency there is a frequency component at either a positive or a negative value. Because of the mirror image relationship, each half of the 500 c.p.s. band includes all values of the frequency component. Thus, a filter means may be used having a band of ½ PRF, if one limit of the pass band of the filter coincides with a harmonic of the PRF. Although only the 5000–5500 c.p.s. band is illustrated, the illustration is taken at random, and similar relationships will be understood to exist for the other possible bands.

Consequently, the present invention further provides that a band pass filter 80 may be employed which has a limit corresponding to a harmonic of the pulse repetition frequency, but which has a pass band equal to one-half the pulse repetition frequency. Through the use of this relationship only minimum filtering need be used although the non-criticality of the filtering is preserved.

A further relationship may be observed as to the frequency location of the band pass filter 80. The frequency band in which the filter 80 operates may be selected to have an absolute value which is less than the reciprocal of the magnitude of time each emitted pulse endures. When so employed, the filter is substantially free of the deleterious influences of noise sources.

It may be noted that the lowest value of Doppler frequency $F_d$ on FIGURE 3 corresponds to a zero value, inasmuch as N may be zero. A Doppler effect is not in fact needed, inasmuch as the product signal from the modulator 76 (FIGURE 1) contains components at the pulse repetition frequency, and the harmonics of the pulse repetition frequency. A filter which is frequency responsive to the PRF may accordingly be used to establish the time agreement relationship needed for ascertaining distance.

In accordance with the present invention, the time constant of the filter 80 is preferably made substantially no greater than a value substantially equal to the quotient of the time duration of each emitted pulse divided by the maximum rate at which the relative delay between the directly emitted pulses and received echoes changes. In observing this relationship, it will be noted that the total interval during which at least partial overlap of pulses occur may be expressed as $2PD/R_{dc}$. The train of pulses of varying duration and amplitude provided during this interval have been shown to be the equivalent of half as many pulses of both constant amplitude and duration distributed over an interval of $PD/R_{dc}$, so that the latter term may be used in establishing the time constant of the filtering means. If the band pass is too narrow, in accordance with these considerations, the buildup should be increased by increasing the pulse duration, decreasing the rate of delay change, or changing the band pass itself.

The system utilizes the signals at the output terminal 82 of the band pass filter 80 to provide both a physical display and a distance data signal representative of the desired distance determination. When the controllable delay 42 places the signals on the terminals 36, 40 in substantial time agreement, and when selected frequency components are provided through the band pass filter 80, the amplitude responsive detector 50 is actuated to generate a pulse. This pulse has several concurrent effects. The detector 50 pulse is applied to the input terminal 48 of the stop means 46 to hold the delay scanning control 44 in the position at which time agreement is established. The delay readout 60 accordingly provides data on its output terminal 62 in the form of a delay indication potential which is passed by the "and" gate 64 as a distance data output signal upon coincident application of the output signal from the detector 50. The distance data signal on the output terminal 66 accordingly may be used by an associated system for automatic control or further processing.

It will be apparent that the output signal from the filter 80 falls somewhere within the overlap interval, but not necessarily at the exact point of full time coincidence. The deviation from full coincidence is a fixed amount for given conditions, however, because filter characteristics, PD and $R_{dc}$ are all known. The exact distance data signal may therefore be generated by introducing a compensation at any one of several points. The delay readout 60 may be offset, for example, or a delay introduced between the terminal 82 and the detector 50. Alternatively, the associated data processor may introduce a corrective factor.

A visual display is concurrently provided by the planned position indicator (P.P.I.) display 70, which is actuated by a pulse from the multivibrator 68 to provide a pip at the point corresponding to the range of the reflecting surface.

One of the material advantages derived from the arrangement of FIGURE 1, and other arrangements in accordance with the invention include the significant factor that the system operation can scan a large distance using only relatively short intervals, without a need for long-term stability in the frequency or the phase of the system. By thus processing the signals which are employed, the capabilities of the existing radar are clearly augmented. Particular note should be taken of the fact that non-critical filtering is used, and that the arrangement is such that even this noncritical filtering may be employed at a most convenient frequency location and may cover a minimum band pass.

In further accordance with the present invention, the coupling 88 which is employed between the pulse rate control adjustment 30 and the band pass adjustment element 86 may be used to control the location and the range of frequencies to which the band pass filter 80 is sensitive in accordance with changes in the emitted pulse periodicity and duration. Such a feature is of significant utility where it is desired to operate with both a search mode and a tracking mode with the same radar. In a search mode, for example, the PRF may be considerably increased and the pulse duration of individual pulses correspondingly reduced. Thus, a PRF of 2000 c.p.s. and pulses of 0.5 microsecond may be used in the search mode. The band of frequencies to which the band pass filter is frequency selective may therefore be adjusted in accordance with the harmonics of the PRF, and if it is sought to minimize the pass band in this instance the filter would be set at a harmonic of the PRF and would cover a band of 1000 c.p.s.

Another significant feature of the operation with this arrangement is derived from the constant frequency and phase relationships between an individual emitted pulse and its corresponding echo. Because a reflection is matched only to the directly emitted representation of the same pulse, variations in frequency introduce no error. Thus, to overcome interfering signal influences, the frequency of a pulse source, such as the frequency of the oscillator 12, may be varied in a continuous manner or even as in a step function. At the same time, normal instabilities of a transmitter as to frequency or phase do not introduce deleterious effects.

A more specific examples of a distance determining system according to the invention which has particular flexibility is illustrated in FIGURE 4. Where feasible, units which correspond to like units in FIGURE 1 have been given similar designations and numbers. In FIGURE 4, the input terminals at which the representations of directly emitted pulse trains and their respective echoes are applied, termed input terminals A and B, corresponding to similarly designated input terminals in FIGURE 1. Such signals, after being heterodyned with oscillator 34 signals in individual mixers 32, 39 are applied to a cyclic recording system which is exemplified as a magnetic drum 90. The drum 90 is rotated at a substantially constant rate by a drum drive 92, and employs a magnetic recording surface with which recording and reproducing heads are operatively associated. A first of the recording heads 94 is coupled to the mixer 39 which provides signals (ST) representative of the directly emitted pulses of oscillatory waves. The second recording head 95 is coupled to the other mixer 32 which provides signals (SR) representative of the reflected or echo pulses. The signals are accordingly recorded in separate channels having like periodicity. The reproducing heads 97, 98 which are used with this arrangement are associated with the same recording channels as are the recording heads 94, 95, but a first of the reproducing heads 97, associated with recorded versions of the directly emitted pulses, is coupled to a mechanically movable scan control device 100 which includes a scan drive having a rotatable offset arm 104 which moves circumferentially about the magnetic drum 90.

In the scan control device 100, means are provided for selectively varying both the extent of the arc of movement of the movable reproducing head 97 and the speed of movement of the variable reproducing head 97. The limits between which the reproducing head 97 moves are controlled by an amplitude control 106 which is governed by an amplitude adjustment means 108, while the speed of movement is governed by a frequency control 110 having a frequency adjustment means 112. Both the amplitude control 106 and the frequency control 110 provide signals to a scan generator 114 which provides a control signal for activating a servo amplifier 116 which is coupled to the scan drive 102. The scan position, or the position of the variable reproducing head 97 relative to the fixed reproducing head 98, is continuously monitored by a position data device 118. For uniformity in controlling the rate of scan, and the scanning position, the position data information is fed back to the servo amplifier 116. It will be appreciated that the speed of movement of the variable reproducing head 97 is directly related to the rate of delay change discussed above in conjunction with FIGURE 1, and the limits between which the variable reproducing head 97 moves is directly related to the extent of the time difference by which the directly emitted and reflected pulses vary. The speed of the magnetic drum 90 is seletced to be such that there will not be any overlap between successive pulses.

The signals which are reproduced by the separate reproducing heads 97 and 98 are applied to different input terminals of a balanced modulator 76, the output terminal of which is coupled to a band pass filter means 80. The band pass filter 80 includes a sequence of individual filters 120, 122, 124, 126, and 128, each of which is selected to cover a different but substantially like frequency band, so that all the filters 120–128 together provide a continuous frequency selective means operating over a given band. The filters 120–128 may be scanned in sequence by a scanning matrix 130 which operates in a regular sequence except upon the application of a "hold" signal from a hold circuit 132. An output signal provided from any one of the filters 120–128 is provided through the scanning matrix 130 to a detector 50, the output terminal of which is coupled to both the hold circuit 132 and a control input of the amplitude responsive "and" gate 64 which provides the distance data signal.

In the operation of the arrangement of FIGURE 4, any one or more of a number of operating variations may be used. It should be recognized first that the magnetic drum 90 provides a recording means which has at the same time both high reliability and having high resolution capabilities. The extent of the displacement of the variable reproducing head 97 may be ascertained readily, and with a high degree of precision. The relationship of the difference in delay to both time and distance may be accurately ascertained when it is desired to change from operation at long range to operation at relatively short range, or vice versa, inasmuch as appropriate adjustments need only be made at the amplitude adjustment means 108 and the frequency adjustment means 112.

The arrangement of the band pass filter means 80 is also particularly flexible. The band pass of each of the filters 120–128 may be sufficiently broad for the filter to be physically realizable but narrow enough so that best signal-to-noise ratio is achieved. Because the scanning matrix 130 "holds" the filter which is providing an output, noise from the other filters has no effect. It will be appreciated by those skilled in the art that the number of filters can be extended to cover a broader range if desired. The matrix 130 can then operate with particular groups of filters as well as with the entire sequence of filters. When the PRF of the system is changed, therefore, the scanning matrix 130 can select a different group of filters for most effective operation.

An added capability for such systems is introduced when the systems incorporate, in accordance with the invention, means for automatically tracking a distant object once the distance of the object has been determined. Circuits for adding this capability to the systems of FIGURE 1 and FIGURE 4 are illustrated in FIGURE 5, which for simplicity shows only certain of the elements of FIGURE 4. As may be seen in FIGURE 5, input terminals C and D correspond to the like designated electrical signal couplings between the variable reproducing head 97 and the fixed reproducing head 98 and the different input terminals of the modulator 76 of FIGURE 4. In the arrangement of FIGURE 5, the input terminals C and D are coupled to the input terminals of two different modulators 136 and 138, but the coupling of the terminal C at which appears the representation of the directly emitted pulse is made to the second modulator 138 through a fixed delay circuit 140. In the present instance, the modulators 136 and 138 have for simplicity been illustrated as separate from the modulator 76 of FIGURE 4, but it will be appreciated that the first modulator 136 may have its function performed by the modulator 76 of FIGURE 1 if desired.

The two modulators 136 and 138 are employed in what may be termed a peak finding circuit, which provides output signals suitable for automatic control purposes. The output terminals of each of the modulators 136, 138 are coupled to separate filters 142, 144 which select frequency components representative of the Doppler frequency and the harmonics of the PRF, as above described. The filters 142, 144 provide, for the pulse overlap interval, trains of pulses corresponding to those represented in simplified fashion in FIGURE 2b. The trains of pulses differ in time by the amount of fixed delay introduced by the fixed delay circuit 140. The two trains of pulses are individually rectified by oppositely poled rectifier elements 146 and 148 and converted to direct current signals of opposite polarity and fixed time difference by the coupling integrating circuits 150, 152. Because of the time difference between the two pulse trains, the direct current signals differ in timing as well as polarity. The output signals from the integrating circuits 150, 152 are applied to an adder circuit 153 which additively combines the two signals to provide sum signals, whose amplitude and sense are suitable for automatic control purposes.

The direct current signals applied to the input terminals of the adder 154 have generally triangular waveforms, as indicated. When combined in the adder 153, a waveform 154 results which has a zero crossing characteristic in the region of time agreement.

When the scanning relationship is at a position of exact time agreement between the representation of the directly emitted and the reflected pulses, the output of the adder circuit 153 is substantially zero. When the directly emitted train of pulses is slightly shifted in one direction in time relative to the reflected pulses, the amplitude of the output signal from the adder circuit 153 changes a proportionate amount and in a selected direction. Thus in the region of time agreement between delayed emitted pulses and the reflected pulses, the output signals from the adder circuit 153 follow the characteristic of the dashed line 154 representing the difference of the signals which are being added.

Before the peak finder circuit operates to track and maintain the time agreement relationship, the region of time agreement is first found by the search circuitry. During the normal search operation, the scan generator 114 provides signals through an inhibit gate 156 to the servo amplifier 116. The inhibit gate 156 is here used as a normally closed switch, except when an input signal is applied at its control input, to cause the inhibit gate 156 to act as an open switch. At the same time that a distance data signal is provided to the "and" gate 155, signifying location of a distant object, the inhibit gate 156 is actuated to disconnect the scan generator 114, and to cause the "and" gate 155 to provide control signals for the servo amplifier 116 from the adder circuit 153. Thus, the amplitude and sense variations in the output of the adder circuit 153 thereafter exercise control of the scan control mechanism, to maintain the system so that a specific reflecting body is tracked and continuous indications are provided of the distance of the reflecting body.

In effect, therefore, when the detector 50 apprehends the presence of a distant body, the distance data signal is used to switch the servo amplifier 116 from the scan generator 114 to the peak finder circuit. Thereafter, the scan drive 102 is maintained in position, tracking the object. Note that during tracking the rate of change of the data from the position data device 118 may be provided from a differentiator 158 to give velocity data as an additional output signal.

While there have been described above and illustrated in the drawings various forms of an arrangement for utilizing the reflection of directly emitted pulses which are provided at a controlled periodic rate to determine the distance of a reflecting body despite the presence of noise and interfering signals, it will be appreciated that a number of modifications may be employed. Accordingly, the invention should be understood to include all variations, modifications, and related arrangements falling within the scope of the appended claims.

What is claimed is:

1. In a distance determining system based upon the measurement of the timing differences between the members of a train of periodically and directly emitted pulses of oscillatory waves and their respective detected echoes, the duration of each of the emitted pulses being substantially equal to one another, the combination of: first means developing a first electrical signal representing, by a pulsed oscillatory component, both the duration and oscillatory wave frequency of the directly emitted pulses and a second electrical signal representing, by a pulsed oscillatory component, both the duration and oscillatory wave frequency of the detected echoes of said directly emitted pulses; second means responsive to said first and second electrical signals for processing said signals to produce a product signal representing substantially only those electrical signal components resulting from the multiplication of said first electrical signal by said second electrical signal; third means imposing controllable, and known, variable values of relative time delays between said first and said second electrical signals during the processing thereof by said second means, the range of said values of time delays embracing a range of values sufficient to bring a given detectable echo, as represented by said second signal, into substantial time agreement with that emitted pulse, as represented by said first electrical signal, which produced said given echo; frequency selective filtering means responsive to said product signal for developing an output signal representing substantially only those component frequencies of said product signal which fall below a value of frequency substantially equal to the reciprocal of the magnitude of time during which each emitted pulse endures; and means responsive to amplitude variations in said output signal for identifying the particular value of relative time delay imposed by said third means which corresponds to the value of time delay, between a given emitted pulse and its echo, upon which a distance measurement is based.

2. In a distance determining system based upon the measurement of the timing differences between the members of a train of periodically and directly emitted pulses of oscilliatory waves and their respective detected echoes, the duration of each of the emitted pulses being substantially equal to one another, the combination of: first means developing a first signal representing, by a pulsed oscillatory component, both the duration and oscillatory wave frequency of the directly emitted pulses and a second signal representing, by a pulsed oscillatory component, both the duration and wave frequency of the detected echoes of said directly emitted pulses; second means responsive to said first and second electrical signals for processing said signals to produce a product signal representing substantially only those electrical signal components resulting from the multiplication of said first electrical signal by said second electrical signal; third means imposing controllable, and known, variable values of relative time delays between said first and said second electrical signals during the processing thereof by said second means, the range of said values of time delays embracing a range of values sufficient to bring a given detectable echo, as represented by said second signal, into substantial time agreement with that emitted pulse, as represented by said first electrical signal, which produced said given echo; frequency selective band pass filtering means responsive to said product signal for developing an output signal representing substantially only those frequency components of said product signal which lie in value between an upper limit and a lower limit of frequency values where the difference between said upper and lower limits is substantially equal in value to the recurrence frequency of said periodically emitted pulses; and means responsive to amplitude variations in said output signal for identifying the particular value of relative time delay imposed by said third means which corresponds to the value of time delay between a given emitted pulse and its echo upon which a distance measurement is based.

3. In a distance determining system based upon the measurement of the timing differences between the members of a train of periodically and directly emitted pulses of oscillatory waves and their respective detected echoes, the duration of each of the emitted pulses being substantially equal to one another, the combination of: first means developing a first signal representing, by a pulsed oscillatory component, both the duration and wave frequency of the directly emitted pulses and a second signal representing, by a pulsed oscillatory component, both duration and wave frequency of the detected echoes of said directly emitted pulses of oscillatory waves; second means responsive to said first and second electrical signals for processing said signals to produce a product signal representing substantially only those electrical signal components resulting from the multiplication of said first electrical signal by said second electrical signal; third means imposing controllable, and known, variable values of relative time delays between said first and said second electrical signals during the processing thereof by said second means, the range of said values of time delays embracing a range of values sufficient to bring a given detectable echo, as represented by said second signal, into substantial time agreement with that emitted pulse, as represented by said first electrical signal, which produced said given echo; frequency selective band pass filtering means responsive to said product signal for developing an output signal representing substantially only those frequency components of said product signal which lie in value between an upper limit and a lower limit of frequency values where the difference between said upper and lower limits is substantially equal in value to one-half the recurrence frequency of said periodically emitted pulses with one of said limits being in turn established at a value of frequency substantially equal to a harmonic of said recurrence frequency; and means responsive to amplitude variations in said output signal for identifying the particular value of relative time delay imposed by said third means which corresponds to the value of time delay between a given emitted pulse and its echo upon which a distance measurement is based.

4. In a distance determining system based upon the measurement of the timing differences between the members of a train of periodically and directly emitted pulses of oscillatory waves and their respective detected echoes, the duration of each of the emitted pulses being substantially equal to one another, the combination of: first means developing a first signal representing, by a pulsed oscillatory component, both the duration and wave frequency of the directly emitted pulses and a second signal representing, by a pulsed oscillatory component, both the duration and wave frequency of the detected echoes of said directly emitted pulses of oscillatory waves; second means responsive to said first and second electrical signals for processing said signals to produce a product signal representing substantially only those electrical signal components resulting from the multiplication of said first electrical signal by said second electrical signal; third means imposing controllable, and known, variable values of relative time delays between said first and said second electrical signals during the processing thereof by said second means, the range of said values of time delays embracing a range of values sufficient to bring a given detectable echo, as represented by said second signal, into substantial time agreement with that emitted pulse, as represented by said first electrical signal, which produced said given echo; a plurality of frequency selective band pass filtering means responsive to said product signal for developing a respective plurality of separate output signals, the band of frequency values represented by each output signal being different from one another with the sum of the frequency band with values embraced by all of said output signals taken together being substantially equal in value to the recurrence frequency at which said pulses of oscillatory waves are emitted; and means for analyzing variations in the amplitudes of said output signals for identfying the particular value of relative time delay imposed by said third means which corresponds to the value of time delay between a given emitted pulse and its respective echo upon which a distance measurement is based.

5. In a distance determining system based upon the measurement of the timing differences between the members of a train of periodically and directly emitted pulses of oscillatory waves and their respective detected echoes, the duration of each of the emitted pulses being substantially equal to one another, the combination of: first means responsive to directly emitted pulses and their detected echoes for developing a first and a second electrical signal respectively representing, by respective pulsed oscillatory signal components, the timing, duration and wave frequency of said emitted pulses and said detected echoes; second means, responsive to and operating upon said first and second electrical signals, for imposing controllable and known values of relative time delay between components of said first and second electrical signals, the range of known values of time delay of which said second means is capable of imposing being sufficiently large to bring into substantial time agreement those components of said first and second electrical signals representing a given emitted pulse and any detected echo of that given pulse which corresponds in timing to a value of distance falling within a given limited range of distance values, the relative time delay being changed at a rate such that there is at least partial time agreement between a number of successive emitted pulses and the corresponding echoes; means responsive to signals operated upon by said second means for producing a product signal whose component signal frequencies together represent substantially only electrical signal products resulting from the multiplication of signal components within said first electrical signal by signal components within said second electrical signal; means responsive to said product signal for developing an output signal whose component signal frequencies represent substantially only those component frequencies of said product signal the values of which fall below a value of frequency substantially equal to the reciprocal of the magnitude of time during which each emitted pulse endures; and means responsive to amplitude variations in said output signal for identifying the particular value of relative time delay, imposed by said second means, which corresponds to that value of time delay which exists between a given emitted pulse and its echo during a given distance measurement.

6. In a distance determining system based upon the measurement of the timing differences between the members of a train of periodically and directly emitted pulses of oscillatory waves and their respective detected echoes, the duration of each of the emitted pulses being substantially equal to one another, the combination of: first means responsive to directly emitted pulses and their detected echoes for developing a first and a second electrical signal respectively representing, by respective pulsed oscillatory signal components, the timing, duration and wave frequency of said emitted pulses and said detected echoes; second means, responsive to and operating upon said first and second electrical signals for imposing controllable and known values of relative time delay between components of said first and second electrical signals, the range of known values of time delay of which said second means is capable of imposing being sufficiently large to bring into substantial time agreement those components of said first and second electrical signals respectively representing a given emitted pulse and any detected echo of that given pulse which corresponds in timing to a value of distance falling within a given limited range of distance values; third means operatively coupled to said second means for cyclically varying the value of relative time delay imposed between components of said first and second electrical signals, over said given range of time delay values, with the average value of time delay change per unit time being less than a value substantially equal to twice the product of the time duration of each emitted pulse and the rate at which said emitted pulses periodically recur; fourth means responsive to signals operated upon by said second means for producing an output signal whose component signal frequencies represent substantially only those signal products resulting from the multiplication of signal components within said first electrical signal by signal components within said second electrical signal, with the highest value of signal frequency in said output signal falling below a value of frequency substantially equal to the reciprocal of the magnitude of time during which each emitted pulse endures; and means responsive to amplitude variations in said output signal for identifying the particular value of relative time delay, imposed by said second means, which corresponds to that value of time delay which exists between a given emitted pulse and its echo during a given distance measurement.

7. In a distance determining system based upon the measurement of the timing differences between the members of a train of periodically and directly emitted pulses of oscillatory waves and their respective detected echoes, the duration of each of the emitted pulses being substantially equal to one another, the combination of: first means responsive to directly emitted pulses and their detected echoes for developing a first and second electrical signal respectively representing, by respective pulsed oscillatory signal components, the timing, duration and wave frequency of said emitted pulses and said detected echoes; second means, responsive to and operating upon said first and second electrical signals, for imposing controllable and known values of relative time delay between components of said first and second electrical signals, the range of known values of time delay of which said second means is capable of imposing being sufficiently large to bring into substantial time agreement those components of said first and second electrical signals respectively representing a given emitted pulse and any detected echo of that given pulse which corresponds in timing to a value of distance falling within a given limited range of distance values; means responsive to signals operated upon by said second means for producing a product signal whose component signal frequencies together represent substantially only electrical signal products resulting from the multiplication of signal components within said first electrical signal by signal components within said second electrical signal; frequency selective filtering means responsive to said product signal for developing an output signal representing substantially only those component frequencies of said product signal which fall below a value of frequency substantially equal to the reciprocal of the magnitude of time during which each emitted pulse endures, the effective time constant of said selective filtering means being made substantially no greater than a value substantially equal to the quotient of the time duration of each emitted pulse divided by the maximum rate at which the relative delay between the directly emitted pulses and received echoes changes; and means responsive to amplitude variations in said output signal for identifying the particular value of relative time delay imposed by said second means, which corresponds to that value of time delay which exists between a given emitted pulse and its echo during a given distance measurement.

8. In a distance determining system based upon the measurement of the differences in time between the individual pulses of a train of periodically and directly emitted pulses of oscillatory waves and their respective detected echoes, the duration of each of the emitted pulses being substantially equal to one another, the combination of: first means responsive to the directly emitted and the detected echo pulses for developing first and second signals representing, by pulsed oscillatory components, both the duration and oscillatory wave frequency of the directly emitted and the detected echo pulses, respectively; second means responsive to said first and second electrical signals for processing said signals to produce a product signal representing substantially only those electrical signal components resulting from the multiplication of said first electrical signal by said second electrical signal; third means imposing controllable, and known, variable values of relative time delays between said first and second electrical signals during processing thereof by said second means, said variable value of time delays embracing a range of values sufficient to bring a given detectable echo, as represented by said second signal, into substantial time agreement with that emitted pulse, as represented by said first electrical signal, which produced said given echo; frequency selective filtering means responsive to said product signal for developing an output signal representing substantially only those component frequencies of said product signal which fall within the spectral distribution of the difference signals; time delay control means coupled to said third means and responsive to said output signal for operating said third means to maintain the value of time delay such that a given detectable echo, as represented by said second signal, is maintained in substantial time agreement with that emitted pulse, as represented by said first electrical signal, which produced said given echo; and means responsive to amplitude variations in said output signal and coupled to said third means for identifying the particular value of relative time delay imposed by said third means which corresponds to the value of time delay, between a given emitted pulse and its echo, upon which a distance measurement is based.

9. In a distance determining system based upon the measurement of the difference in time between the individual pulses in a train of pulsed radiated waves and their respective received echoes, the pulsed waves occurring periodically and the pulses being of substantially equal duration, the combination of: means responsive to the pulsed radiated waves and the received echoes for developing signals representative in duration and frequency of the pulsed radiated waves and the received echoes; balanced multiplying means responsive to the signals representative of the pulsed radiated waves and the received echoes for providing a product signal including a frequency difference component; variable time delay means responsive to the signals representative of the pulsed radiated waves and the received echoes and operable to impose a time delay into the pulsed radiated waves relative to the received echoes, the time delay changing between limits which embrace a range of values sufficient to compensate exactly for the difference between a specific pulsed radiated wave and its received echo, the rate of change of the time delay being selected relative to the duration of the pulses and the interval between pulses such that the time delay maintains the signals representative of the pulsed radiated waves and the received echoes in at least partial time agreement over a selected interval; frequency selective filtering means responsive to said product signal for developing an output signal representing substantially only those component frequencies of said product signal which fall within the spectral distribution of the difference signals; and time delay control means coupled to the means for varying the time delay and responsive to the product signals and the output signals, to operate the time delay means so as to maintain a delay sufficient to compensate for the time difference between the representations of a specific pulsed radiated wave and its corresponding received echo, so as to provide a continual indication of the time difference between the pulsed waves.

10. A system for using periodically transmitted oscillatory pulses as directly received, and also as received after reflection, to determine the time relationship between an individual directly received pulse and the reflected representation of the same pulse despite an extremely low signal-to-noise ratio, including in combination signal storage means responsive to both the directly received and the reflected oscillatory pulses for reproducing the same, the signal storage means including means for controllably delaying the directly received pulses with continuously varying delays which change at a rate selected to provide an interval of pulse overlap, a balanced modulator coupled to the signal storage means and responsive to the reproduced pulses for developing from the reproduced pulses a product signal including as a lower side band a carrier which is pulse modulated in accordance with time agreement between the pulses during the pulse overlap interval, the carrier including regularly spaced frequency components, and band pass filtering means coupled to the balanced modulator and selected to be frequency-sensitive over a band sufficient to encompass at least one of the frequency components in the product signal.

11. A system for operation with a frequency variable pulse radar to utilize pulses of oscillatory waves transmitted at a selected pulse repetition frequency from the radar and the reflections of the pulses from a distant object which is moving relative to the radar to determine the distance of the object despite the concurrent reception of interfering signals, the system including the combination of: a magnetic drum recording system coupled to receive both the transmitted pulses from the radar and the echoes from the distant object for recording signals representative thereof in recording channels having like periodicity; a pair of reproducing means coupled to be separately responsive to the different signals in each of the recording channels, at least one of the reproducing means being continuously movable between limits relative to the other to introduce continuously varying time delays between the reproduced signals, the time delays falling within limits selected to encompass the transmission time of waves to and from the distant object, such that the reproduced signals are brought into time agreement at some relative time delay between the limits; a balanced modulator circuit responsive to the reproduced signals, the balanced modulator circuit developing product signals including oscillatory difference signals defined by frequency components including a fundamental at the frequency of the Doppler component introduced into the received echoes due to the relative movements between the distant object and the radar, the difference signals being in the form of pulses of oscillatory waves having a spectral distribution including groups of regularly separated oscillatory components consisting of the harmonics of the pulse repetition frequency added to and subtracted from the Doppler frequency; frequency selective band pass filtering means responsive to the difference signals in the product signals for developing output signals only upon the occurrence of selected frequency components in the difference signals; and indicating means responsive to the output signals and the magnitude of the variation in relative movement between the individual reproducing means for providing indications of the time differential between a transmitted pulse and its echo, from which the distance of the distant object from the radar may be established.

12. A system for operating with a pulse radar to utilize pulses of oscillatory waves transmitted at a selected pulse repetition frequency from the radar and the echo pulses from a distant object which is moving relative to the radar to determine the distance of the object from the radar despite the concurrent reception of interfering signals, the system including the combination of: a magnetic drum recording system coupled to receive both the transmitted pulses and the respective echoes from the distant object for recording signals representative thereof separately in different cyclic recording channels having like periodicity; a pair of reproducing means coupled to be separately responsive to the different signals in each of the channels, the reproducing means which is associated with the signals representative of the transmitted pulses being movable at a controlled rate between limits to introduce continuously varying time delays in the signals representative of the transmitted pulses with respect to the echo pulse representations caused thereby, the limits between which the delays are varied being selected to encompass the range of transmission times of waves to and from the distant object, such that the reproduced signals are brought into time agreement at some relative time delay between the limits, the rate of delay change being selected with respect to the pulse duration of the transmitted pulses to produce varying amounts of time overlap between the reproduced pulses for a selected interval; a balanced modulator circuit responsive to signals developed by each of the pair of reproducing means, the balanced modulator circuit developing product signals including lower side bands in the form of oscillatory difference signals between the reproduced signals and including a fundamental frequency at the frequency of the Doppler component which is introduced into the received echoes due to the relative movement between the distant object and the radar, the difference signals consisting of a train of pulses of oscillatory waves, the pulses being distributed over an interval determined by the rate of delay change of the movable reproducing means and the duration of the transmitted pulses, the oscillatory waves having a spectral distribution including groups of regularly separated oscillatory components in a sin $x/x$ distribution, consisting of the harmonics of the pulse repetition frequency combined as sums and differences with the Doppler frequency; frequency selective band pass filtering means responsive to the difference signals and having a band width which is sufficient, with respect to the pulse repetition frequency, to encompass at least one of the oscillatory components in the difference signals, the frequency location of the filtering means being within the central portion of the sin $x/x$ pattern of the oscillatory components of the difference signals, such that the filtering means develops output signals only upon the occurrence of the Doppler signals as a result of the time agreement reproduction and balanced modulation of the reproduced signal representations of the transmitted and echo signals; and means responsive to the output signals and the relative position of the movable reproducing means for providing a measure of the time delay between a transmitted pulse and its echo, from which the distance of the distant object from the radar may be established.

References Cited by the Examiner

UNITED STATES PATENTS

| 2,517,549 | 8/50 | Earp | 343—9 |
| 2,535,274 | 12/50 | Dicke | 343—9 |
| 2,913,717 | 11/59 | Brandon et al. | 343—17.2 |

CHESTER L. JUSTUS, *Primary Examiner.*

FREDERICK M. STRADER, *Examiner.*